Dec. 27, 1927.                                          1,653,712
F. LAFEUILLE
CRYSTALLIZER
Filed July 10, 1925          2 Sheets-Sheet 1
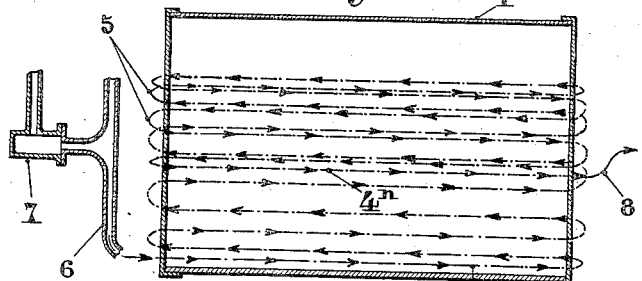
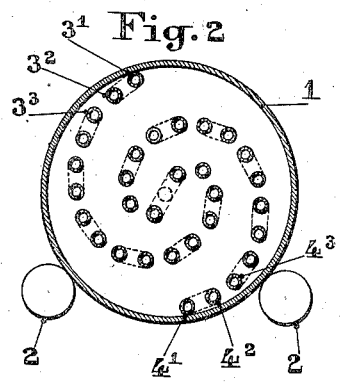
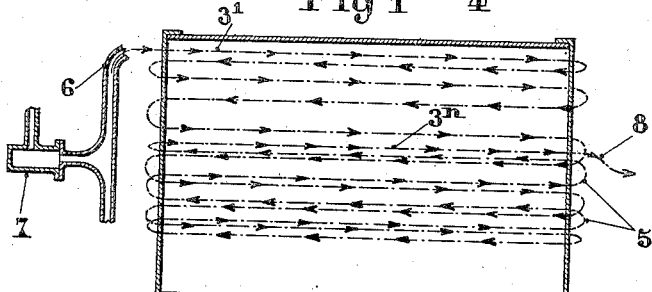
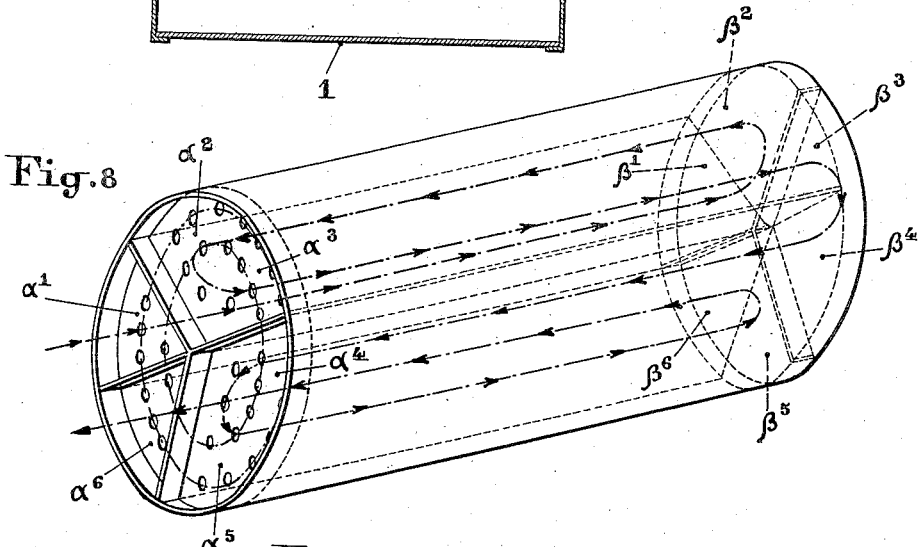
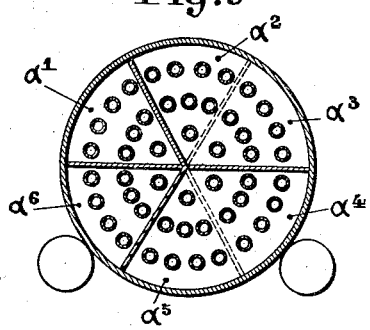
Inventor:
F. Lafeuille Dec. 27, 1927.  
F. LAFEUILLE  
CRYSTALLIZER  
Filed July 10, 1925
1,653,712
2 Sheets-Sheet 2
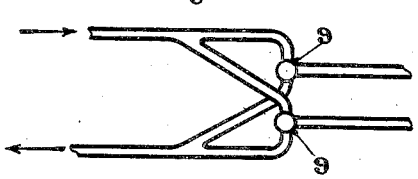
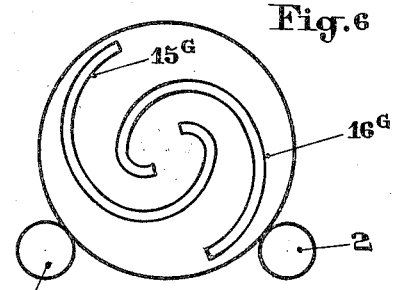
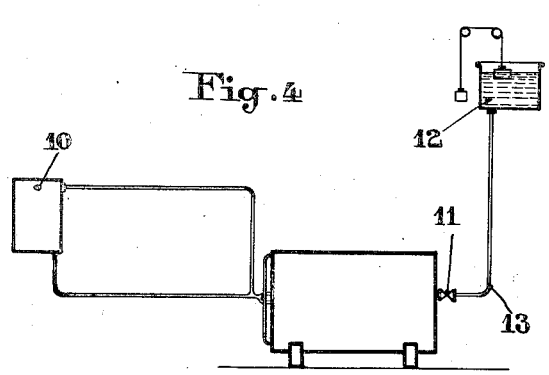
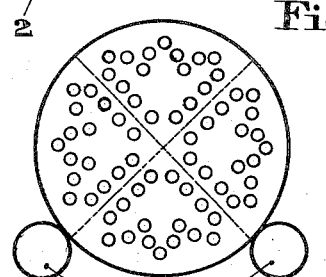
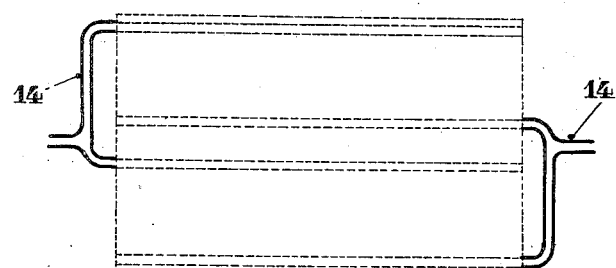
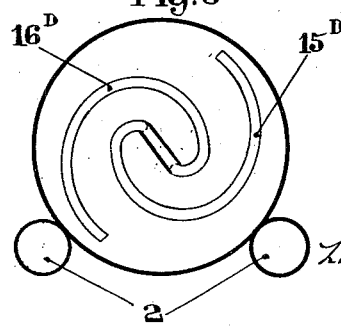
Inventor:
F. Lafeuille Patented Dec. 27, 1927.

1,653,712

UNITED STATES PATENT OFFICE.

FERNAND LAFEUILLE, OF PARIS, FRANCE.

CRYSTALLIZER.

Application filed July 10, 1925, Serial No. 42,802, and in France December 24, 1924.

The invention relates to a mixer-crystallizer for the cooked masses from sugar making or from refining or for supersaturated solutions of any kind in the chemical industry, formed of a cylindrical vat turning upon rollers with circulation tubes connecting the two ends of the vat together, the said mixer-crystallizer comprising the application of a certain number of means which all assist in obtaining a uniformity of the heat exchanges in the apparatus.

The diagrammatic Figures 1 to 9 in the accompanying drawing illustrate the following description and assist in making clear the developments which it comprises.

Apparatus of the rotary tubular mixer type shown in Figures 1 and 2 in longitudinal and cross section is known.

A cylindrical vat 1 is carried upon friction rollers 2. Straight tubes connect the two ends of the vat. These tubes are grouped in two series along two concentric spiral curves, $3^1$, $3^2$, $3^3$ ... $3^n$ forming the first spiral series and $4^1$, $4^2$ $4^3$ ... $4^n$ forming the second series. In each series, the tubes are connected in pairs by communication headers or boxes 5, 5. Finally the outermost tubes of each series $3^1$ and $4^1$ are assembled and connected by a vertical water admission tube 6, the two branches of which are equal, to a stuffing box 7 through which is admitted the circulating water while the most central tubes $3^n$ and $4^n$ are assembled and connected together by an outlet tube 8 for the water, the two branches of which are equal, the water being exhausted along the axis of the apparatus. Ports and valves, not shown, serve for the admission and emptying of the cooked mass, as well as for the entry of water or syrups it may be necessary to add to the cooked mass.

A modification of the arrangement given above has already been described. It consists in grouping the water inlet and outlet at one of the ends of the apparatus, the two tubes being concentric, which arrangement is known and easily obtainable by means of a suitable stuffing box.

This retrospective description will enable the features of the invention to be shown by first showing the defects in the apparatus mentioned above. In fact, if this mixer is cut into a series of cross sections, it is noted that between all these sections there is absolute mathematical equality of the thermal working for if, in any one of these sections, the arithmetic sum of the temperatures of the circulating water is taken upon each tube, this sum is exactly the same whatever section be considered. This fact is a consequence of the alternating movement of each stream of liquid passing regularly from left to right, then from right to left in the apparatus. But on the other hand, if one examines what takes place from the thermal point of view within one section, it is noted, on the other hand, that there is complete inequality. The two outer tubes receiving the cold water, which flows through the tubes, approaching towards the axis of the apparatus, it is found that the circumferential part of the working mass is always much cooler than the central part (or vice versa if the circulation is in the opposite direction). In the section the iso-thermal lines are therefore concentric circles and the thermal working to which the mass is subjected in the central part differs absolutely from that to which it is subjected in the circumferential part. Further, this is an obvious defect the consequences of which may be serious. It is known in fact, that in the case of artificial cooling of the cooked masses, there is a very great danger of producing the formation of an irregular grain, which under the influence of sudden or too rapid cooling, is formed in the mother liquor between the principal crystals and which not only detracts from the quality of the sugar obtained, but further, considerably impedes the circulation and, sometimes even makes it impossible.

To this first disadvantage is added a second which is also well known and consists of the hardening or sticking of the cooked masses and particularly cooked masses of high purity upon a cold wall. If therefore a part of the wall is constantly cold the risk is run of sticking being produced against this part while nothing of this kind would be produced if this part could be heated from time to time without interrupting on this account the cooling of the mass.

A third disadvantage is the gradual decrease in cooling efficiency of the mixer due to the fact that the difference in temperature between the cooling mass and the circulating fluid is constantly decreasing.

Finally, a fourth disadvantage of the rotary mixer which also detracts from the regularity and continuity of its action, is the impossibility which exists of adding water or syrups for altering the density of the mother liquor without being compelled to stop the apparatus in a particular position in order to open a valve and pour in the additional liquid.

The invention overcomes these various defects, in the following way:—

(a) Instead of making the cold water enter through the two outermost tubes $3^1$ and $4^1$, it is made to enter through the outer tube $3^1$ of one of the series and through the most central tube $4^n$ of the other series. In this way, upon every circle concentric to the apparatus, traced in any section, there are two tubes the temperatures of which are symmetrically disposed relatively to the mean temperature of the whole.

(b) Upon the inlet and outlet water tubes, is arranged (see Fig. 3) a system of taps by means of which the direction of circulation of the water may be reversed at any moment in such a way that the coldest tubes become the hottest and vice versa. Figure 3 shows a device formed of three way taps 9, 9. A set of four ordinary taps may also be employed. Finally, the operation of these taps may be rendered automatic by means of a suitable connection, mechanical, hydraulic, electrical or of any other kind, with the control of the crystallizer.

(c) A device for regulating the temperature of the water at inlet is provided upon the inlet water tube.

For example in a works having at its disposal a source of supply of very hot water and a source of supply of very cold water a vat or cylinder of the mixture is made and provided with a thermometer and regulating taps, so that by comparison with a thermometer immersed in the cooked mass a predetermined difference between the two thermometers may be obtained. Or again, if the works has at its disposal simply very cold water, an apparatus 10 for heating water, by means of steam, heated directly from a fire or working in any other way, is fitted to the mixer, and the water passes through this preheater before entering into the cooling mixer. Or again, if several mixers are placed together, the circulation orifices of the different pieces of apparatus are connected together, in such a way as to make the water circulate in series from the most cooled mixer to the least cooled mixer. This device further effects a considerable reduction in the quantity of water consumed. Or again in the case where the works has at its disposal a small amount of water or else if the water at its disposal is not sufficiently cold, a refrigerating machine is attached to the crystallizer (working upon $CO_2$, ammonia or upon any other method). Particularly in hot countries this device is very useful.

(d) Upon the end of the apparatus opposite the one through which the circulating water enters and passes out, and at the centre, is provided a valve and a tap 11 for adding diluting liquids to the cooked mass by means of a pipe 13 from a gauging vat 12. A stuffing box, not shown, enables the junction to be made between the fixed part and the movable part. With this arrangement it is possible, without stopping the crystallizer, and according to the degree of cooling obtained, to add to the cooked mass a previously calculated volume of the liquid prepared in the gauging vat. Instead of a charging vat a pump may be provided for forcing the liquid into the crystallizer.

All the devices described above are given by way of example, and in a non-limiting manner. Further, with regard to (a) the following series of modifications may be made:

1. In an apparatus with two series of tubes in concentric spirals, the entry and outlet of which is made at the two ends of the apparatus, each tube with two equal branches may be replaced by a tube with unequal branches of complementary length 14—14 (Fig. 5). Or again the two series of tubes may be connected so that they form only one, the water entering at $3^1$ and issuing through $4^1$.

2. In an apparatus with two series of tubes in concentric spirals, the communication headers or boxes which connect the tubes in pairs may be replaced by collector headers $15^G$, $16^G$ placed upon the left hand end of the apparatus and by similar headers (hereinafter called $15^D$, $16^D$) placed upon the right hand end, each corresponding to a whole series of tubes arranged in a spiral (see Fig. 6). The header $15^G$ is connected by a stuffing box to the water inlet tube, the headers $15^D$ and $16^D$ are connected together and finally the header $16^G$ is connected to the outlet tube. In this way the water flows in parallel lines and simultaneously through all the tubes placed on one of the spirals running from left to right, then it passes through the tubes of the other series, through which it flows in parallel lines and simultaneously from right to left. An inlet and an outlet for each spiral series of tubes may also be provided.

3. The arrangement of the tubes upon concentric spiral curves may be replaced by an arrangement upon curves separate from each other each corresponding, for example, to a sector of a circle, as shown in Figure 7. In this case care will be taken to place the water inlets and outlets upon one and the same circle. It will be noted with reference to the figure that under these conditions any circle traced about the axis of the apparatus crosses tubes the temperatures of which are, taken in pairs, symmetrically disposed relatively to the mean temperature of the circulating water.

4. The tubes may be grouped, no longer along lines but in actual bundles, the headers communicating the tubes together being replaced by true double bottomed star-shaped partitioned ends placed at each end of the apparatus (Figs. 8 and 9). The structure of this arrangement becomes similar to the types of apparatus well known in sugar making as juice or liquor reheaters with multiple circulations, but instead of being fixed and vertical like the latter, the crystallizer with partitioned tubular bundles is on the contrary placed horizontally and turns about its axis. The water, admitted through a tube provided with a stuffing box, arrives into the sector $\alpha^1$ of the left hand double end, passes through the tubes in this sector into the sector $\beta^1$ of the right hand double end, then into the sector $\beta^2$, then through the tubes of the second sector into the sector $\alpha^2$ of the left hand double end and from there into $\alpha^3$ from whence it reaches $\beta^3$, and so on until it reaches $\alpha^6$, and from there to the tubular outlet, concentric with the tubular inlet and provided with the necessary stuffing boxes.

It will be noted with reference to these figures that upon each circle concentric with the apparatus there are symmetrical temperatures and that further the longitudinal to and fro motion of the water ensures a thermal equality over the length.

What I claim is:

1. A rotary crystallizer, comprising, a closed cylindrical casing, a plurality of sets of tubes arranged in, and longitudinally of, the casing, to form in section a plurality of concentric spirals of tubes each running from the periphery of the casing to its central axis, means interconnecting the tubes of each set to form continuous conduits, an inlet and an outlet for each set, one-half of the sets having inlets at the periphery and outlets at the center and the other half of the sets having inlets at the center and outlets at the periphery.

2. A rotary crystallizer, comprising, a closed cylindrical casing, a plurality of sets of tubes arranged in, and longitudinally of, the casing, to form in section a plurality of concentric spirals of tubes each running from the periphery of the casing to its central axis, means interconnecting the tubes of each set to form continuous conduits, an inlet and an outlet for each set, one-half of the sets having inlets at the periphery and outlets at the center and the other half of the sets having inlets at the center and outlets at the periphery, and valve means for reversing the inlets and outlets for reversing the direction of flow.

In testimony whereof I have signed my name to this specification.

FERNAND LAFEUILLE.